3,053,675
PROCESS OF AND MATERIAL FOR TREATING LOOSE POROUS SOIL
Solomon J. Rehmar and Norman L. Liver, Cleveland, Ohio, assignors, by mesne assignments, to Intrusion-Prepakt, Inc., Cleveland, Ohio, a corporation of Ohio
No Drawing. Filed May 29, 1958, Ser. No. 738,638
11 Claims. (Cl. 106—123)

This invention pertains to the art of stabilizing loose porous soils, and more particularly to a process for and material for treating and filling the voids of such soils.

It has long been known to pressure inject liquid grouts such as Portland-cement-base grouts, either with or without various bulk fillers or beneficiating admixes, into relatively soft or porous soils for the purpose of increasing the bearing capacity thereof or for the purpose of preventing the infiltration of water therethrough, or both.

The process is rather simple where the soil is a soft clay or a fine silt wherein the individual particles are very fine, that is to say, on the same order of size as the cement particles themselves, or smaller. In such cases, the grout appears to cleave planes or channels through the soil mass, compressing the soil and leaving substantial masses of grout to harden and provide the desired result.

However, when the same cement base grout is forced into soil consisting predominantly of larger particles than the cement particles, such as sand, even in a loosely compacted condition, extreme difficulty is encountered in forcing the cement particles to penetrate for even very short distances, for example, a few millimeters to a few inches depending on the void size between the sand particles. The sand appears to form a very tight filter bed preventing the further penetration of the cement particles through the sand and also preventing the cleavage action such as occurred with clays or very fine silt.

For the purposes of convenience, coarse grained soil of the type to which the present invention pertains, will be referred to hereinafter as sand, it being understood that by sand is meant a soil made up predominantly of particles having a size of from 10–30 times, e.g. .06–2 mm., the size of conventional cement particles.

It is known that such coarse grained soils may be readily pressure injected by liquids containing dissolved chemicals, for example, chemicals which will effect a gelling action after standing for the necessary length of time for the required chemical action to take place between the various dissolved ingredients. However, when it is desired to inject gelling agents into the soil, cost becomes a major factor. Thus, ordinarily large volumes of fluid must be employed. For this reason, water is ordinarily employed as the solvent, and it is desirable to use as dilute a solution as possible. As the dilution is increased, however, the gelling time increases proportionately, and for most commercial soil injecting operations, it is desirable that the gelling time be held to a minimum so that the subsequent operations on the soil may be performed with a minimum time delay.

One known relatively cheap gel-forming composition is a solution in water of one or more of the hexavalent chromium compounds, for example, sodium dichromate and waste lignin liquor, such as calcium lignin sulphonate. However, with such a solution, one of the problems has been that when highly diluted with water, an unduly long gelling time results. Also after the gelling action is completed, the strength of the gel rapidly decreases to a value of approximately 60% of the maximum strength.

The present invention contemplates, and has for its principal object, a method of treating such coarse particled soil before the injection of a liquid grout thereinto that overcomes all of the above-referred to difficulties, and others, and enables sand to be as readily pressure grouted with any cement base or other grout as the fine clays or silts hereinabove referred to.

Further, the present invention contemplates and has for its principal object a gel forming composition which overcomes the above-referred to objections and is comprised of a mixture of chemical compounds which are all relatively cheap, readily available, and which when dissolved in large amounts of water, give a rapid gelling action with a minimum loss of strength over substantial periods of time.

Another object of the invention is the provision of a new and improved method of pressure grouting sand with a liquid grout which enables the grout to be pressure injected long distances through the sand.

Another object of the invention is the provision of a new and improved method of pressure grouting sand which enables large areas to be effectively grouted with a minimum number of injection points.

Still another object of the invention is the provision of a new and improved method of pressure grouting sand with a liquid grout which consists of first pressure injecting a liquid into the sand containing chemicals which will effect a gelling action, and after such liquid has at least commenced to gel, injecting a liquid grout into the sand.

Another object of the invention is the provision of a new and improved gelling compound which has a rapid gelling action and is relatively cheap to manufacture.

Another object of the invention is the provision of a new and improved mixture of chemicals which when dissolved in large quantities of water effects a rapid gelling action.

Still another object of the invention is the provision of a new and improved gelling compound which retains its strength for substantial periods of time.

In accordance with one aspect of the present invention, sand, either loosely or tightly compacted, is first pressure injected by means of a low viscosity fluid containing a mixture of dissolved chemical compounds which will form a plastic gel within a predetermined, preferably short, period of time. After the gelling action has at least commenced to take place, a liquid grout is pressure injected into the sand gel mixture, and thereafter allowed to harden.

It has been found that the gel appears to hold each sand particle in a fluid suspension separated from the adjacent sand particles whereby the grout particles appear to be lubricated and can readily move between the sand particles into the voids located substantial distances from the point of entry into the sand.

In this respect, it is known to independently inject either gelling compounds or liquid grout into the earth, but it is believed that we are the first to appreciate that by first injecting a gelling compound into sand, that the particles of a liquid grout can, in contradistinction to previous experiences, be forced to travel through the sand for relatively long distances.

The gel, in accordance with the present invention, must be one which may be termed a plastic gel, that is, one which will yield under the grouting pressures to be subsequently used as distinguished from a "rigid gel" which will not yield, and thus will not permit the subsequent penetration of the grout.

The chemical compounds employed for the purpose of effecting the gelling action must be those capable of dissolving completely in the liquid employed, as distinguished from those which will form a liquid suspension of very fine particles and would thus be filtered out by the sand as are the cement particles in the absence of the present invention.

By a liquid grout is meant any mixture of a liquid and particles fine enough to remain in suspension in the liquid until the particles have been pumped to the most remote location of the gelling compound. Thus the liquid grout may be a Portland-cement type grout, either with or without additives, or lubricating agents, or may be a slurry of clay or any other fine particled material capable of performing the desired result when filling the voids of the soil.

In accordance with another aspect of the present invention, a gel forming composition is comprised of a mixture of a hexavalent chromium salt and lignin which has had the sugar content reduced to at least below 8% and preferably 5%. Thus tests leading to the present invention indicated that as the sugar content, which is normally about 30% in lignin, is reduced, the gelling time surprisingly also was reduced, little improvement in the gelling time, however, being noticed when the sugar content was reduced below 5%.

The sugar content of the lignin may be reduced by any known means, such as dialysis, fermentation, fractionation, distillation, or the like.

Thus a base gelling composition is provided consisting of the following water solution of base ingredients: 10 to 30 parts by weight of a hexavalent chromium salt and 80 to 50 parts by weight of a lignin having a sugar content below 8%.

When this base composition is dissolved in water, and in the presence of an acid, e.g., an acid soil, the lignin in liquor form reacts with the chromium salt to reduce the chromium from the hexavalent to the trivalent state with the desired resultant gelling action.

In the event this composition is to be employed in alkaline type soils, then it should also include an acid medium preferably in the form of an acid salt e.g., aluminum sulphate in amounts of from 10 to 30 parts by weight.

Further in accordance with the invention, the rate of gelling is further accelerated by the addition of a cupric salt, preferably copper sulphate and one or more of the metallic salts, but preferably a metallic salt selected from the class consisting of ferric chloride, sodium chloride, calcium chloride, or ferric sulphate. While any one of these salts will act to accelerate the rate of gelling, the cupric salt, when used in combination with at least one of the other salts, gives an increased rate of gelling substantially greater than when either of the mentioned salts are used alone. The composition may include such accelerators in amounts of from 2 to 25% of the weight of the base ingredients.

The hexavalent chrome salts are quite poisonous and if the existence of such poisonous compounds in the soil is deemed dangerous, then the mixture may also include further amounts of metallic or alkali reducing salts, such as the ferrous salts or alkali sulphites in excess of the stoichiometric amounts such that over a period of time after the desired gelling action has taken place, all of the hexavalent chromium salt will eventually be reduced to the trivalent state.

While it is believed that all of the inorganic hexavalent chromium salts will function, only sodium dichromate and potassium dichromate are sufficiently low in price to be practical for use in injecting into soil either for the purpose of congealing the soil or for the purpose of preparing the soil for a further cement base grout injection.

The water soluble lignin may be any of the various lignins, e.g., sodium or ammonium lignin sulphonate, obtained by known methods such as reacting wood chips or sawdust with calcium sulphite or sodium bi-sulphite. However, calcium lignin sulphonate is relatively cheap, is readily available, and is thus preferred for use in accordance with the present invention.

The acid salt may also be as desired, but for the same reasons, aluminum sulphate is preferred.

Of the various accelerators, copper sulphate is the cheapest and most available cupric salt, and is accordingly preferred. Calcium chloride while being slightly more expensive than sodium chloride, is preferred because for the same results approximately one-half as much calcium chloride is required as sodium chloride.

In compounding the mixture, it is desirable to use the maximum amount of the cheaper compound, and the minimum amount of the more expensive compounds. Thus it is preferred to use as much of the lignin as is possible without adversely affecting the gelling time beyond that required for the particular type of work to be performed.

In accordance with the preferred embodiment of the invention, the invention contemplates a base mixture of the following compounds in parts by weight:

| | |
|---|---|
| Calcium lignin sulphonate, containing less than 8% sugar | 30 to 60 |
| Sodium dichromate | 10 |
| Aluminum sulphate | 10 | and accelerators expressed as a percent by weight of the base mixture

| | Percent |
|---|---|
| Copper sulphate | 1 to 5 |
| and | |
| Calcium chloride | 1 to 10 |
| or | |
| Sodium chloride | 2 to 20 |

This mixture, when mixed with 3½ to 6 parts of water, has an effective gelling time of ½ to 4 hours, and retains over 90% of its maximum strength indefinitely.

In using the present invention in an area of the earth which is to be stabilized, and where it is known that sand as above defined exists, a pressure grouting pipe of known construction is forced into the soil to the desired depth, the method of forcing the pipe into the soil forming no part of the present invention. It will be appreciated that the grouting pipe may have an opening only at the bottom or a series of openings along the length thereof.

The gelling composition, as above described, is then added to the water in the amounts indicated, and thoroughly agitated to effect a dissolving in the water. Thereafter the solution is pumped through the grouting pipe under such pressures as will cause it to penetrate outwardly to the voids of the soil for the desired distances without erupting upwardly to the earth's surfaces. Ordinarily pressures of approximately .1 pound per square inch per foot of depth, or less, are employed. The amount of the solution which is pumped into the earth will have been previously calculated depending upon the volume of the earth which is to be grouted, and the percentage of voids determined from core samples previously taken.

The composition of the solution is such that its viscosity remains low until a short time before actual gelling occurs, the time depending upon the dilution of the solution and on the amount of accelerators employed. In any event, each sand particle appears to be held in suspension in the gelling solution so that they will be held separated one from the other in the event a liquid grout is to be later injected.

While the injected mass may be left in this condition, namely, with the gelling composition only, in some instances, and in accordance with the invention, after the gel forming composition has been injected and has commenced to gel, a liquid grout and preferably a cement base grout is then pumped through the same pressure grouting pipe into the soil until the desired amount of grout has been pumped or until the soil will not accept more grout or both. The grout is then allowed to harden, and the soil will then be stabilized.

Obviously if the gel forming composition alone is to be employed, it will be diluted to the lesser amounts above indicated, and if a cement base grout is to be subsequently pumped in, the gel forming composition will be diluted to the maximum amounts.

Thus it will be seen that a method of stabilizing sandy soil by means of a liquid grout has been described which enables the liquid grout to be pumped through the sandy soil through long distances not withstanding the normal tendency of sandy soils to effect a filtering action and to prevent the movement of the solid particles in a liquid grout through the voids between the sand particles. Further, it will be seen that a gelling composition has been described which is relatively cheap which has a very rapid gelling action and which retains its maximum strength over long periods of time.

Further, the invention enables the heretofore impossible grouting of sandy soils with a cement base grout.

The invention has been particularly described with reference to a preferred embodiment. Obviously modifications and alterations will occur to others upon a reading and understanding of this specification, and it is the intention to include all such modifications and alterations insofar as they come within the scope of the appended claims.

Having thus described our invention, we claim:

1. A gelling composition adapted to be injected into the earth for filling the voids thereof, said composition consisting essentially of a water solution of an inorganic hexavalent chromium salt in amounts of from 10 to 30 parts by weight, and from 80 to 50 parts by weight of a water soluble lignin having a sugar content below 8%.

2. A gelling composition adapted to be dissolved in water for the purpose of effecting a gelling action thereof, said composition consisting essentially of from 10 to 30 parts by weight of an inorganic hexavalent chromium salt and from 80 to 50 parts by weight of a water soluble lignin having a sugar content below 8%.

3. A mixture adapted to be dissolved in water, and effect a gelling action thereon, said mixture consisting essentially of from 10 to 30 parts by weight of an inorganic hexavalent chromium salt, from 80 to 50 parts by weight of a water soluble lignin having a sugar content below 8%, and from 10 to 30 parts by weight of an acid salt.

4. A gelling composition adapted to be dissolved in water and effect a gelling action thereon, comprising from 10 to 30 parts by weight of an inorganic hexavalent chromium salt selected from the class consisting of sodium dichromate and potassium dichromate and of 80 to 50 parts by weight of calcium lignin sulphonate containing less than 8% sugar.

5. A gelling composition adapted to be dissolved in water and effect the gelling action thereon, said compound consisting essentially of from 10 to 30 parts by weight of a hexavalent chromium compound selected from the class consisting of sodium dichromate and potassium dichromate, from 80 to 50 parts by weight of a lignin selected from the class consisting of sodium, ammonium, and calcium lignin sulphonate having a sugar content less than 8%.

6. The composition of claim 5 wherein from 10 to 30 parts by weight of an acid salt are also included.

7. A gelling composition adapted to be dissolved in water and effect a gelling action thereon, said composition consisting essentially of the following ingredients in the amounts stated in parts by weight: calcium lignin sulphonate containing less than 8% sugar, 30 to 60; sodium dichromate, 10; aluminum sulphate, 10; and accelerators expressed as a percent by weight of the above ingredients: copper sulphate, 1 to 5%; and, at least one metallic salt selected from the group consisting of calcium chloride in amounts of 1 to 10 percent and sodium chloride in amounts of 2 to 20%.

8. A method of pressure injecting sand with a liquid grout, comprising the steps of pressure injecting said sand with a water solution of a gelling composition consisting essentially of in part by weight, calcium lignin sulphonate containing less than 8% sugar, 30 to 60; sodium dichromate, 10; aluminum sulphate, 10; and an accelerator expressed as a percent by weight of the above ingredients, copper sulphate, 1 to 5%; and a metallic salt selected from the group which consists of calcium chloride, 1 to 10%, and sodium chloride, 2 to 20%, all mixed with 3½ to 6 parts of water, and at least after such solution has commenced to gel, pressure injecting a liquid grout into said sand.

9. A gelling mixture adapted to be dissolved in water and effect a gelling action thereon, said mixture consisting essentially of 10 to 30 parts by weight of an inorganic hexavalent chromium salt, and from 80 to 50 parts by weight of a water soluble lignin having a sugar content below 8%, an acid salt from 10 to 30 parts by weight, and an accelerator consisting essentially of copper sulphate and one or more metallic salts selected from the class consisting of ferric chloride, sodium chloride, calcium chloride and ferric sulphate, such accelerator being present in amounts of from 2 to 25% of the first-mentioned ingredients.

10. The composition of claim 6 wherein an accelerator in amounts of from 2–25% of the other ingredients are included, said accelerator consisting essentially of copper sulphate and one or more metallic salts selected from the class consisting of sodium chloride, calcium chloride and ferric sulphate.

11. The method of pressure injecting a liquid grout containing solid particles in suspension into sand having particle size such as to prevent the passage of such solid particles between said sand particles, said method comprising the following steps: pressure injecting the sand with a low viscosity solution which subsequently gels and, at least after the gelling of such solution has commenced, pressure injecting the sand with the liquid grout.

References Cited in the file of this patent

UNITED STATES PATENTS

| | | |
|---|---|---|
| 1,553,220 | Cross | Sept. 8, 1925 |
| 2,375,019 | Miller | May 1, 1945 |
| 2,839,417 | Tousignant et al. | June 17, 1958 |
| 2,860,060 | Benedict et al. | Nov. 11, 1958 |